(12) United States Patent
Aghvami et al.

(10) Patent No.: US 12,313,833 B2
(45) Date of Patent: May 27, 2025

(54) METHODS AND DEVICES FOR BIOCOMPATIBLE GLASS-BOTTOM MICROSCOPY CHAMBERS

(71) Applicants: Brandeis University, Waltham, MA (US); President and Fellows of Harvard College, Cambridge, MA (US)

(72) Inventors: S. Ali Aghvami, Waltham, MA (US); Tim Sanchez, Cambridge, MA (US); Seth Fraden, Waltham, MA (US); Daniel Needleman, Cambridge, MA (US); Marta Venturas Pedro, Cambridge, MA (US)

(73) Assignees: Brandeis University, Waltham, MA (US); President and Fellows of Harvard College, Cambridge, MA (US)

( * ) Notice: Subject to any disclaimer, the term of this patent is extended or adjusted under 35 U.S.C. 154(b) by 431 days.

(21) Appl. No.: 17/754,955

(22) PCT Filed: Oct. 16, 2020

(86) PCT No.: PCT/US2020/056100
§ 371 (c)(1),
(2) Date: Apr. 18, 2022

(87) PCT Pub. No.: WO2021/076978
PCT Pub. Date: Apr. 22, 2021

(65) Prior Publication Data
US 2022/0382036 A1 Dec. 1, 2022

Related U.S. Application Data

(60) Provisional application No. 62/923,309, filed on Oct. 18, 2019.

(51) Int. Cl.
*G02B 21/34* (2006.01)
*B01L 3/00* (2006.01)
*B01L 9/00* (2006.01)

(52) U.S. Cl.
CPC ............ *G02B 21/34* (2013.01); *B01L 3/5085* (2013.01); *B01L 9/52* (2013.01); *B01L 2200/0689* (2013.01); *B01L 2300/0803* (2013.01)

(58) Field of Classification Search
CPC ........ G02B 21/34; G02B 21/00; G02B 21/36; G02B 21/32; G02B 21/24; G02B 21/26;
(Continued)

(56) References Cited

U.S. PATENT DOCUMENTS 7,245,368 B2 7/2007 Scaduto
2009/0098659 A1* 4/2009 Abhyankar ........... B01L 3/5027
427/230
(Continued)

FOREIGN PATENT DOCUMENTS

WO 2021076978 4/2021

OTHER PUBLICATIONS

International Search Report and Written Opinion for corresponding Application No. PCT/US2020/056100, mailed Jan. 29, 2021.
Sanchez et al., "Combined noninvasive metabolic and spindle imaging as potential tools for embryo and oocyte assessment," Human Reproduction, vol. 34, Issue 12, Dec. 2019, pp. 2349-2361, https://doi.org/10.1093/humrep/dez210.

*Primary Examiner* — Arnel C Lavarias
(74) *Attorney, Agent, or Firm* — Quarles & Brady, LLP (57) ABSTRACT

A device for imaging sensitive biological samples is provided. The device can include a plastic frame and a glass coverslip, each can be comprised of a biologically compatible material. The device can then be configured such that a biological sample placed therein can only be in contact with
(Continued)

biologically compatible materials and, when imaged, provide optimal imaging characteristics by allowing imaging through the glass coverslip.

20 Claims, 3 Drawing Sheets

(58) Field of Classification Search
CPC .. B01L 3/5085; B01L 9/52; B01L 2200/0689; B01L 2300/0803; B01L 3/00; B01L 3/50; B01L 3/508; B01L 9/523; B01L 2300/0848; B01L 2300/0851
USPC ............. 359/398, 362, 363, 368, 369, 396; 435/289.1, 305.1, 305.2, 305.3, 305.4; 436/46, 807, 809; 206/316.1; 356/244
See application file for complete search history.

(56) References Cited

U.S. PATENT DOCUMENTS

| | | | |
|---|---|---|---|
| 2009/0105095 A1* | 4/2009 | Deutsch | B01L 3/5027 506/39 |
| 2010/0135860 A1* | 6/2010 | Halamis | C12M 23/34 422/400 |
| 2012/0004139 A1 | 1/2012 | Staker | |
| 2016/0010045 A1* | 1/2016 | Cohen | C12M 23/38 435/305.1 |
| 2016/0289669 A1 | 10/2016 | Fan et al. | |
| 2016/0339427 A1* | 11/2016 | Wiktor | B01J 19/0046 |
| 2017/0160532 A1 | 6/2017 | Thomas et al. | |
| 2017/0199368 A1 | 7/2017 | Goodwin et al. | |
| 2018/0327702 A1 | 11/2018 | Gannon et al. | |
| 2022/0235303 A1* | 7/2022 | Nicolas | C12M 23/12 |

* cited by examiner

METHODS AND DEVICES FOR BIOCOMPATIBLE GLASS-BOTTOM MICROSCOPY CHAMBERS

CROSS-REFERENCE TO RELATED APPLICATIONS

The present application represents the U.S. national stage entry of International Application No. PCT/US2020/056100, filed on Oct. 16, 2020, which is based on, claims priority to, and incorporates herein by reference in its entirety, U.S. Provisional Patent Application No. 62/923,309, filed on Oct. 18, 2019, and entitled "Methods and Devices for Biocompatible Glass-bottom Microscopy Chambers."

STATEMENT REGARDING FEDERALLY SPONSORED RESEARCH

Not Applicable.

BACKGROUND

In general, glass-bottom dishes can be used for imaging.

BRIEF SUMMARY

In some aspects, the present disclosure provides devices and methods for microscopy of biological samples. The device includes a plastic frame, where the plastic frame includes a first surface and a second surface, the second surface of the plastic frame including a recess configured to receive a glass coverslip. The device also includes a main cavity extending partially through the plastic frame, the main cavity defining a cavity surface. The cavity surface includes at least one microwell extending from the cavity surface of the plastic frame to the second surface of the plastic frame, the at least one microwell forming a through hole in the plastic frame and configured to receive a biological sample. The recess includes a first channel and a second channel defining an interface surface between the first channel and the second channel, the interface surface adapted to provide a continuous seal when the glass coverslip is received within the recess.

In some aspects, the present disclosure provides methods for making the cell imaging device for microscopy. The method includes forming a recess on a second surface of a plastic frame having a first surface and a second surface, the recess adapted to receive a glass coverslip. The method also includes forming provisions on the plastic frame adjacent to the recess for mechanically securing the glass coverslip to the plastic frame. The method further includes forming at least one through hole in the plastic frame through the recess, the at least one through hole adapted to receive a biological sample. The method also includes forming, within the recess, a first channel and a second channel, the region between the first channel and the second channel defining an interface surface, where the interface surface is adapted to provide a continuous seal between the glass coverslip and the interface surface of the recess, and where the plastic frame, the glass coverslip are comprised of biocompatible materials.

In some aspects, the present disclosure provides methods of performing microscopy of a sensitive biological sample. The method including providing a plastic frame including a first surface and a second surface opposite the first surface, the second surface including a recess adapted to receive a glass coverslip, the recess including a first channel and a second channel, the first channel and the second channel defining an interface surface between the first channel and the second channel, a through hole bored through the recess of the plastic frame, and the through hole is adapted to receive a biological sample. The method also includes placing a non-adhesive sealing agent on the interface surface between the first channel and the second channel. The method further includes placing a glass coverslip in the recess, where when the glass coverslip is placed in the recess, the non-adhesive sealing agent forms a continuous seal on the interface surface. The method also includes mechanically securing the glass coverslip to the plastic frame and placing a biological sample in the through hole, wherein the biological sample is in contact with the plastic mask and the glass coverslip.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

Also as used herein, ordinal numbers are used for convenience of presentation only and are generally presented in an order that corresponds to the order in which particular features are introduced in the relevant discussion. Accordingly, for example, a "first" feature may not necessarily have any required structural or sequential relationship to a "second" feature, and so on. Further, similar features may be referred to in different portions of the discussion by different ordinal numbers. For example, a particular feature may be referred to in some discussion as a "first" feature, while a similar or substantially identical feature may be referred to in other discussion as a "third" feature, and so on.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

A ubiquitous constraint in imaging applications for sensitive biological samples is the need to use plastic dishes. Imaging through plastic dishes can cause significant reductions in imaging quality, impacting resolution, polarization fidelity, and signal-to-noise ratio. Conversely, imaging through thin glass coverslips can provide far superior resolution and fluorescence excitation efficiency.

While optimal imaging for some modalities can be achieved using thin glass coverslips, sensitive samples can be negatively impacted when cultured on glass. For example, while embryos normally grow to the blastocyst stage in plastic dishes, growth is routinely arrested at around the 2-cell stage when cultured on even the cleanest glass surface.

Additionally, conventional glass-bottom dishes require an adhesive to attach a bottom coverslip to a plastic frame. Independent of the negative effects of culturing on pure glass, even indirect contact between cell cultures and the adhesive is sufficient to arrest embryo development.

Lastly, sample drift during long-term imaging acquisition can be a common problem. Well-of-well dishes made with plastic injection molding can address this problem, but this requires imaging through plastic and, as previously stated, this can cause significant reductions in imaging quality, impacting resolution, polarization fidelity, and signal-to-noise ratio.

Therefore, there is a need to provide biologically compatible glass-bottom coverslips to provide optimal imaging quality, without the use of adhesives to bond the coverslip to a plastic frame.

The present invention overcomes the aforementioned limitations in conventional imaging dishes, such as plastic petri dishes or pure glass-bottom dishes. Generally, the present disclosure provides an adhesive-free design. This adhesive-free design can include treated glass coverslips, used for optimal imaging, with a plastic frame. The treated glass coverslip, in combination with the plastic frame, can maximize biological compatibility.

Figure 1:
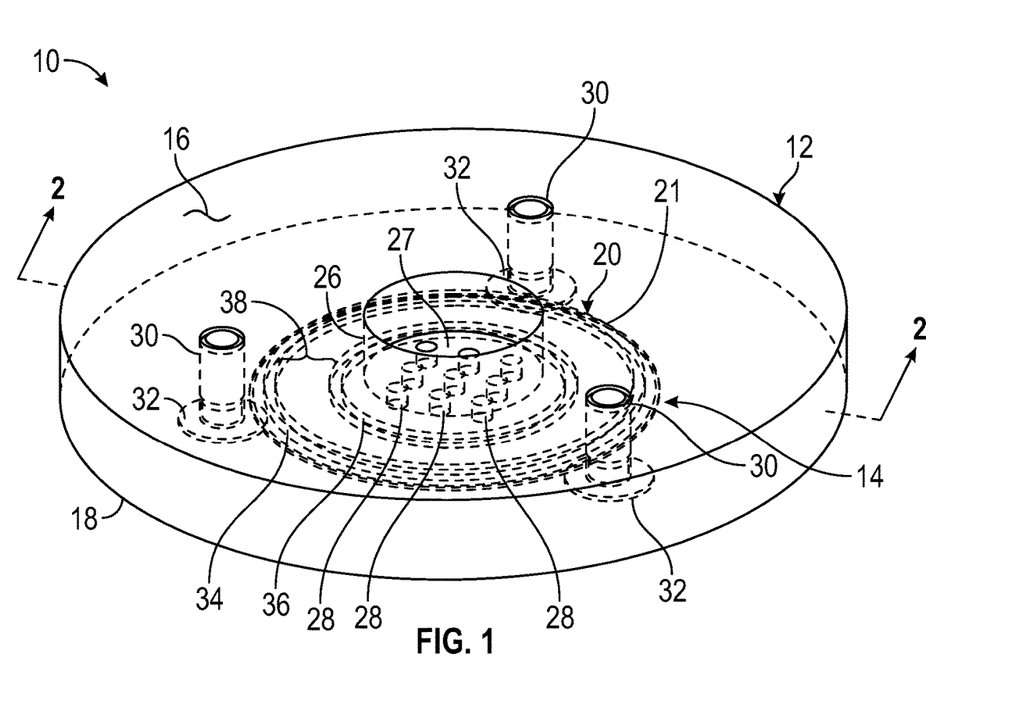
FIG. 1 is a perspective view of the top of a cell imaging device according to some aspects of the present disclosure.
Figure 2:
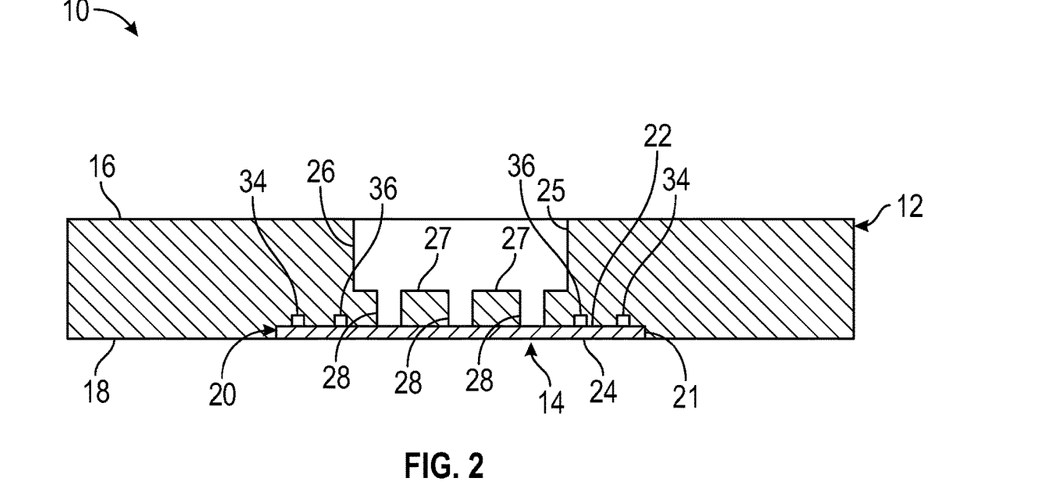
FIG. 2 is an exemplary cross-sectional illustration of the cell imaging device of FIG. 1 taken along line 2-2.

FIGS. 1 and 2 illustrate one non-limiting example of a cell imaging device 10 according to the present disclosure. The cell imaging device 10 can include a plastic frame 12 and a glass coverslip 14. It is to be understood that the plastic frame 12 and the glass coverslip 14 are illustrated as being translucent or transparent. In the illustrated non-limiting example, the plastic frame 12 can be substantially cylindrical in shape, however one skilled in the art would recognize that the general shape of the plastic frame 12 can also be substantially rectangular or any other arbitrary design. The plastic frame 12, for example, may be made out of polystyrene. The plastic frame 12 can include a first surface 16 (e.g., a top surface from the perspective of FIG. 1) and a second surface 18 (e.g., a bottom surface from the perspective of FIG. 1) opposite the first surface 16. In the illustrated non-limiting example, the first surface 16 can be parallel to the second surface 18. The second surface 18 can include a recess 20 configured to receive the glass coverslip 14. The recess 20 can extend partially into the plastic frame 12 from the second surface 18 of the plastic frame 12 towards the first surface 16 to a depth that can be substantially similar to a thickness of the glass coverslip 14.

FIG. 2 is an exemplary illustration of a cross section of the cell imaging device 10. The glass coverslip 14 can include a first surface 22 (e.g., a top surface from the perspective of FIG. 1) and a second surface 24 (e.g., a bottom surface from the perspective of FIG. 1) opposite the first surface 22. The depth of the recess 20 can be dimensioned such that the second surface 18 of the plastic frame 12 can be flush with the second surface 24 of the glass coverslip 14 when the glass coverslip 14 is assembled with the plastic frame 12. The recess 20 can also define a recess diameter 21, which can be sized to receive the glass coverslip 14. As such, an outer edge of the glass coverslip 14 can be dimensioned to be received within the recess 20.

The glass coverslip 14 can be treated with a treatment that can render the glass biocompatible (e.g., safe for use with embryos). For example, the glass coverslip 14 may be treated with a substance that can render the glass hydrophobic. In some non-limiting examples, the substance can be a siliconization chemical. This treatment may, for example, produce a biologically compatible glass surface that can allow blastocyst development rates similar to that of plastic petri dishes known in the art.

The plastic frame 12 can also include a main cavity 26 extending partially through the plastic frame 12 from the first surface 16 towards the second surface 18. The main cavity 26 can define a sidewall 25 and a base 27 (e.g., a bottom surface of the main cavity 26 from the perspective of FIG. 1). In the illustrated non-limiting example, the sidewall 25 can be a cylindrical sidewall. The base 27 can be substantially parallel to the first surface 16 or the second surface 18 of the plastic frame 12. The base 27 of the main cavity 26 can include at least one microwell 28 that can extend from the base 27 (see FIG. 2) of the main cavity 26 to the recess 20 such that the microwell 28 meets the first surface 22 of the glass coverslip 14. In the illustrated non-limiting example, the microwell 28 creates a through hole in the plastic frame 12. As best illustrated in FIG. 2, the plastic frame 12 can define a sidewall of the microwell 28 and the glass coverslip 14, when assembled onto the plastic frame 12, can define a base of the microwell 28.

The microwell 28 can be substantially cylindrical in overall shape, however one skilled in the art would readily recognize that the shape of the microwell 28 is not only limited to cylinders. In one non-limiting example, the microwell 28 can be substantially conical in shape (see FIG. 4), with a large opening of the cone towards the main cavity 26 and a small opening of the cone towards the recess 20. In another non-limiting example, the microwell 28 can be substantially semi-spherical in overall shape, defining a bowl-like recess that opens towards the main cavity 26. As such, the shape of the microwells 28 illustrated in FIG. 2 are exemplary and not meant to be limiting.

In one non-limiting example, the main cavity 26 can be configured to receive a buffer solution therein. For example, a cell sample (not shown) can be placed within the microwell 28 to be imaged. The main cavity 26 can then be filled with the buffer solution (e.g., using a pipet or the like) to provide nutrition to the cell sample (e.g., an embryo). As such, the buffer solution, received within the main cavity 26 can provide a stable environment for the cell sample. For example, a buffer solution may contain concentrations of $CO_2$, $O_2$, and other forms of cell nutrition. One of ordinary skill in the art would readily recognize the various viable buffer solutions that can be used in biological imaging applications.

In the illustrated non-limiting example, the main cavity 26 can include a plurality of microwells 28 for high throughput imaging. In one non-limiting example, the plurality of microwells 28 can be organized in a regular, geometric pattern (e.g., see FIG. 1). In the illustrated non-limiting example, the main cavity 26 can include nine microwells 28 arranged in a grid. In some non-limiting examples, the main cavity 26 can include more or less than nine microwells 28. In another non-limiting example, the main cavity 26 can include one microwell 28 centrally positioned within the main cavity 26 (see FIG. 4).

Referring now to FIG. 1, in one non-limiting example the plastic frame 12 can also include at least one fastener hole 30 adjacent to the outer edge of the recess 20. The fastener hole 30 can extend at least partially through the plastic frame 12 from the second surface 18 of the plastic frame 12 towards the first surface 16 of the plastic frame. The fastener holes 30 can be configured to receive a corresponding fastener 32. In the illustrated non-limiting example, the fastener 32 can be used to secure the glass coverslip inside the recess 20 of the plastic frame 12.

In the non-limiting example illustrated in FIG. 1, a plurality of fastener holes 30 can be circumferentially spaced along the outer edge of the recess 20. The term fastener is not intended to be limiting, and one skilled in the art would interpret the term fastener as any form of mechanical attachment configured to be received within a fastener hole. For example, the fastener 32 can be a machine screw that can be threaded into the fastener hole 30. The fastener 30 may also be a bolt, screw, threaded rod with a nut, or any other form of fastener capable of securing the glass coverslip 14 to the plastic frame 12. In another non-limiting example the fastener 32 can be a pin with a corresponding button head, where the pin can be pressed into the fastener hole 30, thereby securing the glass coverslip 14 to the plastic frame 12. In yet another non-limiting example, the fastener holes 30 can be through holes, where the fastener 32 can extend through the fastener hole 30 to receive a nut.

Other forms of mechanically securing the glass coverslip 14 to the plastic frame 12 are also possible. For example, the plastic frame 12 can include at least one spring clip that, when slid over the glass coverslip 14, secures the glass coverslip 14 to the plastic frame 12. In another non-limiting example, wax can be placed around the recess diameter 21 of the recess 20 on the plastic frame 12 and the outer edge of the glass coverslip 14. The wax can be placed such that it overlaps the plastic frame 12 and the outer edge of the glass coverslip 14, thereby securing the glass coverslip 14 to the plastic frame 12.

Figure 3:
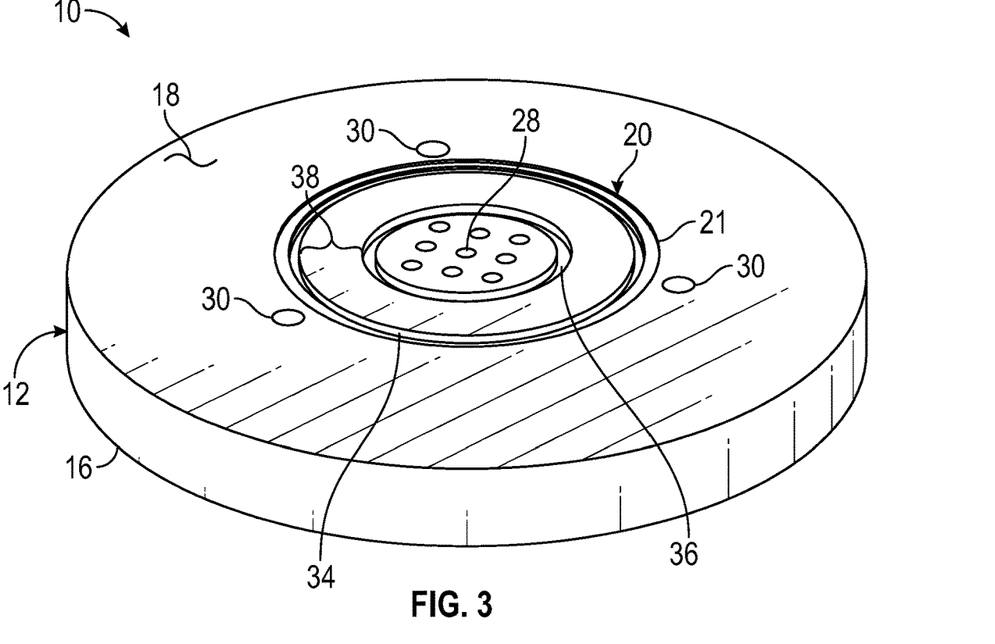
FIG. 3 is a perspective view of the bottom of the cell imaging device of FIG. 1.

Referring now to FIG. 3, the plastic frame 12 can also include channels within the recess 20. In one non-limiting example, the recess 20 can include a first channel 34 (e.g., an outer channel from the perspective of FIG. 1) and a second channel 36 (e.g., an inner channel from the perspective of FIG. 1). The recess 20 can also include an interface surface 38 located in the region between the first channel 34 and the second channel 36. During assembly of the cell imaging device 10, a layer of a non-adhesive sealing agent (not shown) can be placed on the interface surface 38 such that when the glass coverslip 14 is placed on the plastic frame 12, a continuous seal can be formed between the interface surface 38 of the recess 20 and the first surface 22 of the glass coverslip 14 (glass coverslip not shown, see FIG. 1). The first channel 34 and the second channel 36 can be configured to receive excess non-adhesive sealing agent that may be squeezed out when placing the glass coverslip 14 into the recess 20 of the plastic frame 12. In that way, the non-adhesive sealing agent can be prevented from entering the region of the microwells 28 due to the location of the second channel 36 (e.g., inner channel) surrounding the microwells 28.

In one non-limiting example, the non-adhesive sealing agent may be a droplet of oil. The droplet of oil can be placed on the interface surface 38 within the recess 20 of the plastic frame 12. Once the droplet of oil is placed, the glass coverslip 14 can be inserted into the recess 20. The oil may then be trapped between the first channel 36 and the second channel 36 and may be sandwiched between the plastic frame 12 and the glass coverslip 14. In some non-limiting examples, the plastic frame 12 can be formed of an oleophilic material (e.g., polystyrene). In this specific non-limiting example, oil can be precluded from going toward the microwell 28 within the main cavity 26 or toward the outer edge of the recess 20 owing to the oleophilic material of the plastic frame 12. In the specific example of a polystyrene plastic frame 12, the polystyrene can be a safe material for biological samples and glass can be the best material for imaging through the cell imaging device 10. Thus, the combination of the plastic frame 12, the glass coverslip 14, and the trapping of the non-adhesive sealing agent between the first and second channels 34, 36, can create a solution for high quality biological sample imaging, without the use of any adhesive or biologically incompatible sealing or structural materials.

In another non-limiting example, the non-adhesive sealing agent placed on the interface surface 38 can be that of a biocompatible fluid that can prevent a cell culture, media, or bio samples from leaking out of the microwells 28. In one non-limiting example, the non-adhesive sealing agent can be that of a layer of mineral oil that can be applied on the recess 20 between the glass coverslip 14 and the plastic frame 12 (e.g., onto the interface surface 38). The mineral oil can spread to make a continuous seal and excess mineral oil can build up within the first channel 34 and the second channel 36. Cell cultures, media, or bio samples can then be placed (e.g., pipetted) into the microwells 28 within the main cavity 26. In addition to spreading mineral oil within the recess 20, the microwells 28 can also be overlaid with mineral oil to prevent evaporation of the cell cultures, media, or bio samples placed therein. Mineral oil can be compatible with sensitive bio samples (e.g., an embryo), where safety and biocompatibility standards are of the upmost concern. In one non-limiting example, the non-adhesive sealing agent can be that of any other form of biocompatible grease or oil and it is to be understood that mineral oil as just one exemplary option.

In the illustrated non-limiting example, bio samples, when placed into the microwells, may only come in contact with the glass coverslip 14, the plastic frame 12, and the biocompatible non-adhesive sealing agent, which are highly safe from a biocompatibility perspective. Thus, the present invention can be safe for any sensitive biological sample, including embryos, which are well known in the art to be the most sensitive samples commonly studied.

When in use, the non-adhesive sealing agent can be placed on the interface surface 38 of the recess 20 in the plastic frame 12. The glass coverslip 14 can then be placed in the recess 20 of the plastic frame 12 and secured thereto. The excess non-adhesive sealing agent can build up within the first channel 34 and the second channel 36 and a continuous seal may be formed between the glass coverslip 14 and the interface surface 38, thereby preventing contaminate from entering the microwells 28 within the main cavity 26. The biological sample can then be placed into the one or more microwells 28 provided within the main cavity 26 of the plastic frame 12. In this way, the biological sample may only be in contact with the plastic frame 12, the glass coverslip 14, and the non-adhesive sealing agent. The structure of the plastic frame 12 and the combined glass coverslip 14 (i.e., the microwell providing a through hole on the plastic frame to meet the glass coverslip) can be configured to provide optimal imaging characteristics by allowing for imaging of the biological sample only through glass.

Figure 4:
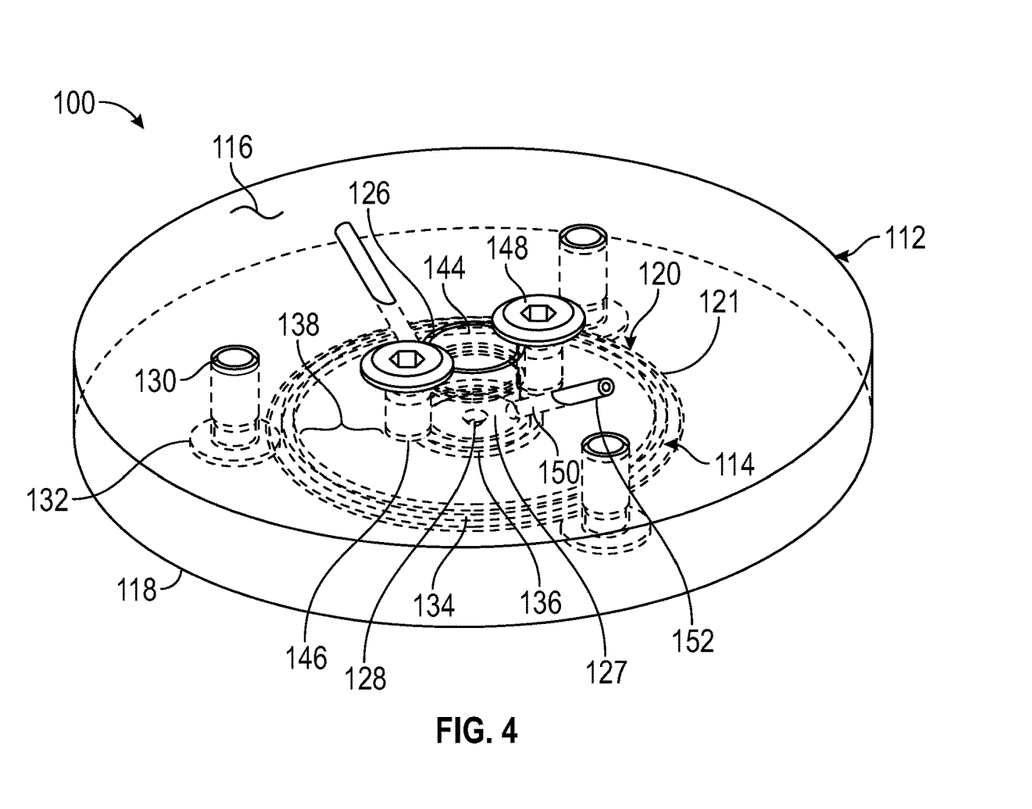
FIG. 4 is a perspective view of the top of a cell imaging device according to another non-limiting example.
Figure 5:
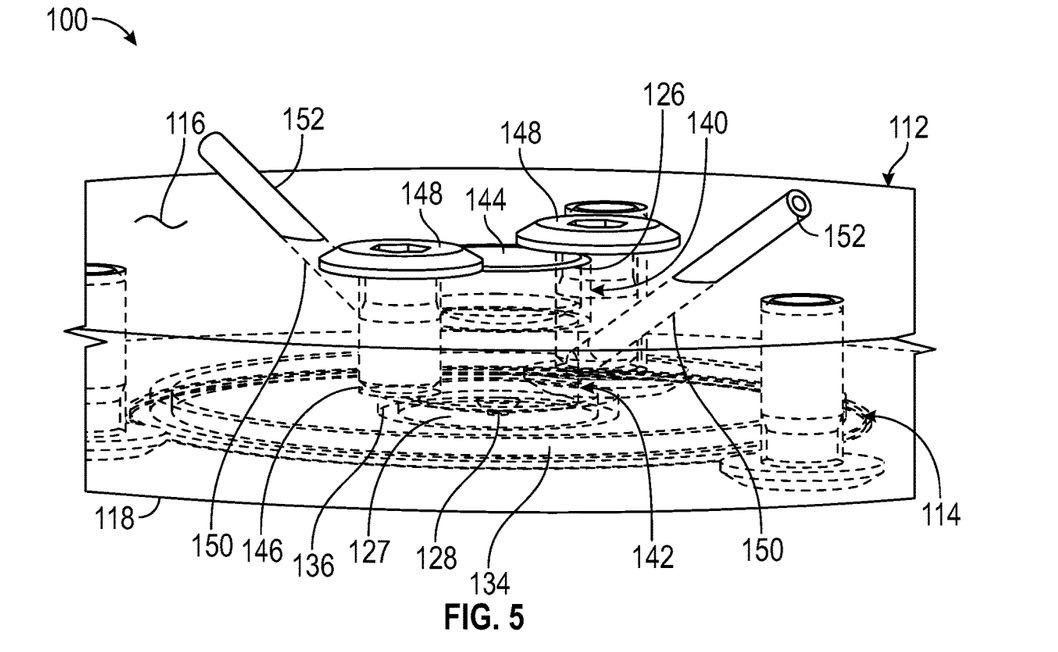
FIG. 5 is a perspective view of a main cavity of the cell imaging device of FIG. 4.
Figure 6:
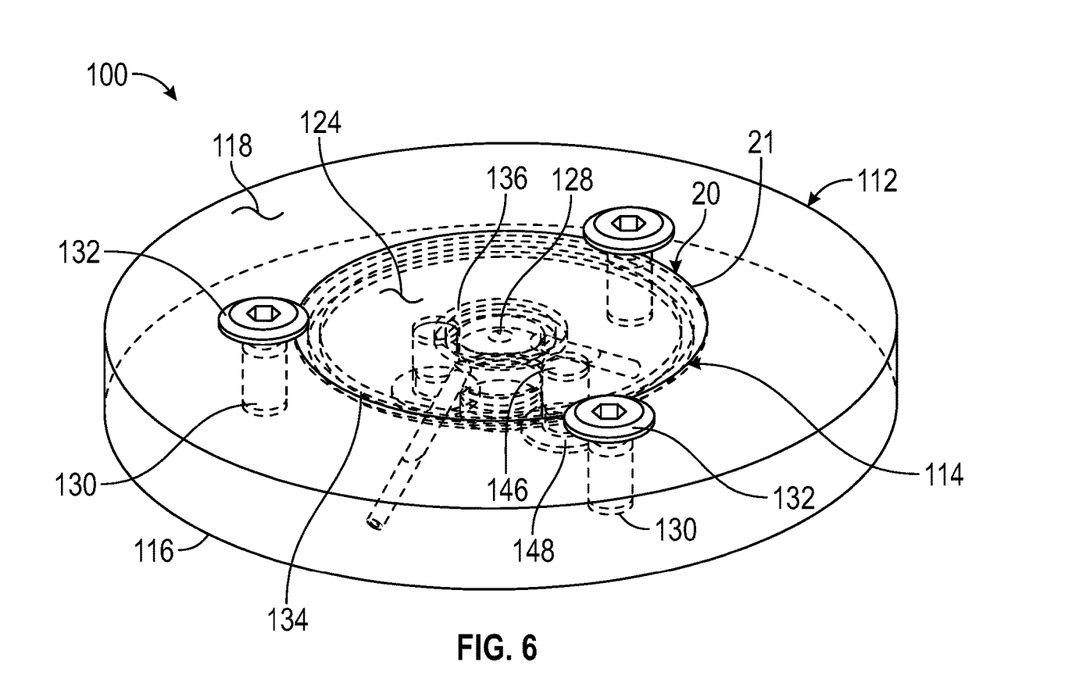
FIG. 6 is a perspective view of the bottom of the cell imaging device of FIG. 4.

Other modifications of the cell imaging device 10 are contemplated as well. For example, FIGS. 4-6 illustrate another non-limiting example of a cell imaging device 100 according to the present disclosure. It is to be understood that many aspects and features of the cell imaging device 100 depicted in FIGS. 4-6 can be substantially similar to that of the cell imaging device 10 depicted in FIGS. 1-2. Reference numerals for similar features will be labeled the same as that in FIGS. 1-2, with the only difference being that the following reference numerals will be in the 100's. For example, the cell imaging device 100, similar to that of the cell imaging device 10, can include a plastic frame 112 and a glass coverslip 114. The plastic frame 112 can include a first surface 116 (e.g., a top surface from the perspective of FIG. 4) and a second surface 118 (e.g., a bottom surface from the perspective of FIG. 4). The second surface 118 can include a recess 120 configured to receive the glass coverslip 114. The glass coverslip 114 can include a first surface 122 (e.g., a top surface from the perspective of FIG. 4) and a second surface 124 (e.g., a bottom surface from the perspective of FIG. 4). It is to be understood that the plastic frame 112 and the glass coverslip 114 are illustrated as being translucent or transparent.

The plastic frame 112 can also include a main cavity 126 extending partially through the plastic frame 112 from the first surface 116 towards the second surface 118. The main cavity 126 can include at least one microwell 128 that can extend from a base 127 (e.g., a bottom surface of the main cavity 126 from the perspective of FIG. 4) of the main cavity 126 to meet the first surface 122 of the glass coverslip 114, thereby creating a through hole in the plastic frame 112 by way of the microwell 128. The main cavity 126 can also define a first sidewall 140 (e.g., an upper inner surface of the main cavity 126 from the perspective of FIG. 6) and a second sidewall 142 (e.g., a lower inner surface of the main cavity 126 from the perspective of FIG. 6). In the illustrated non-limiting example, the first sidewall 140 can define a larger diameter than the second sidewall 142.

Referring now to FIG. 6, in one non-limiting example the first sidewall 140 of the main cavity 126 can be configured to receive a lens 144 (e.g., a microlens, condenser lens, etc.). The lens can be configured to provide high numerical aperture (NA) imaging of the bio sample (not shown) within the microwell 128. The first surface 116 of the plastic frame 112 can also include at least one lens fastener hole 146 adjacent to the main cavity 126. The lens fastener hole 146 can extend partially through the plastic frame 112 from the first surface 116 of the plastic frame 112 towards the second surface 118 of the plastic frame 112. The lens fastener hole 146 can be configured to receive a corresponding lens fastener 148. The lens fastener 148 can be used to secure the lens 144 inside the main cavity 126 of the plastic frame 112. In the non-limiting example illustrated in FIG. 4, a plurality of lens fastener holes 146 can be circumferentially spaced along the outer edge of the main cavity 126.

Other forms of mechanically securing the lens 144 to the plastic frame 112. For example, the plastic frame 112 can include at least one spring clip that, when slid over the lens 144, secures the lens 144 to the plastic frame 112. In one non-limiting example, at least one spring loaded post can be placed adjacent to the main cavity 126 such that the post can be biased to engage and positively retain the lens 144 within the first sidewall 140 of the main cavity 126. In another non-limiting example, a flexible o-ring may be secured along the circumference (e.g., in an o-ring channel that can be formed in the first sidewall 140) of the main cavity 126 of the plastic frame 112 such that when the lens 144 is placed therein, the flexible o-ring may stretch to positively retain the lens 144 and provide securement via friction between the flexible o-ring and the lens 144.

The plastic frame 112 can further include diagonal side holes 150. The diagonal side holes 150 can be bored (or otherwise formed) through the plastic frame 112 from the first surface 116 of the plastic frame into the second sidewall 142 of the main cavity 126. The diagonal side holes 150 can be configured to receive tubes 152 that can be inserted into the bored diagonal side holes 150. In one non-limiting example, the tubes 152 can provide media or gas exchange during imaging. The media or gas exchange capability may be beneficial during continuous or long-term imaging.

In another non-limiting example, the tubes 152 can provide a fluid conduit to the main cavity 126 to allow for a buffer solution to be received therein (e.g., pumped into the main cavity 126). For example, biological samples may require buffer solutions with a maintained concentration of $CO_2$ and other compounds. As such, the tubes 152 can provide fluid conduit into and out of the main cavity 126 such that the buffer solution can be continuously replaced or exchanged. In one non-limiting example, the tubes 152 can provide fluid conduit to replace one buffer solution with another buffer solution to study the effect of changing the environment of the biological sample. For example, a Fluorescence Lifetime Imaging (FLIM) technique could be used to study the biological sample. In FLIM measurement, a lifetime of the fluorescent emission can be monitored, which can be directly influenced by the interaction of the fluorophore with the environment. As such, precise control of the environment (e.g., within the main cavity 126) can be critical during FLIM measurements and the tubes 152 can provide precise control of the buffer solution by allowing for continuous buffer solution exchange.

One skilled in the art would recognize the various manufacturing methods that can be used to make the plastic frame described above. In one non-limiting example, the features of the plastic frame, including the main cavity, the microwells, the first channel, the second channel, the recess, and the diagonal side holes, can be machined out of a solid block of plastic. In another non-limiting example, the plastic frame can be formed using additive manufacturing methods. In another non-limiting example, the plastic frame can be formed using plastic injection molding.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A device for microscopy of biological samples, the device comprising:
    a plastic frame having a first surface and a second surface, the second surface of the plastic frame including a recess configured to receive a glass coverslip;
    a main cavity extending partially through the plastic frame from the first surface towards the second surface, the main cavity defining a base; and
    at least one microwell extending from the base of the cavity to the recess in the second surface, the at least one microwell forming a through hole in the plastic frame and configured to receive a biological sample;
    wherein the recess includes a first channel and a second channel defining an interface surface between the first channel and the second channel, the interface surface adapted to provide a continuous seal when the glass coverslip is received within the recess.

2. The device of claim 1, wherein the interface surface is adapted to receive a non-adhesive sealing agent and the first channel and the second channel are configured to receive excess non-adhesive sealing agent when the glass coverslip is received within the recess.

3. The device of claim 2, the device including the glass coverslip positioned within the recess and the non-adhesive sealing agent positioned between the interface surface and the glass coverslip, thereby forming the seal.

4. The device of claim 3, wherein the glass coverslip is mechanically coupled to the plastic frame.

5. The device of claim 4, wherein the glass coverslip is coupled to the plastic frame using at least one fastener.

6. The device of claim 1, wherein the glass coverslip is a surface coated glass coverslip and configured to be biocompatible.

7. The device of claim 1, wherein the plastic frame comprises a plurality of microwells, each of the plurality of microwells configured to receive the biological sample.

8. The device of claim 1, wherein the continuous seal is configured to prevent contaminants from entering the microwell.

9. The device of claim 1, wherein the main cavity further defines a sidewall, wherein at least one hole extends from the sidewall of the main cavity to outside the plastic frame, the at least one hole adapted to provide media or gas exchange between the outside of the plastic frame and the main cavity.

10. The device of claim 1, wherein the main cavity of the plastic frame is configured to receive a lens.

11. The device of claim 10, the device comprising the lens, wherein the lens is mechanically coupled to the plastic frame.

12. The device of claim 11, wherein the lens is coupled to the plastic frame with at least one fastener.

13. A method for making a cell imaging device for microscopy, the method comprising:
    a) forming a recess on a first surface of a plastic frame, the recess adapted to receive a glass coverslip;
    b) forming provisions on the plastic frame adjacent to the recess for mechanically securing the glass coverslip to the plastic frame;
    c) forming at least one through hole in the plastic frame through the recess, the at least one through hole adapted to receive a biological sample; and
    d) forming, within the recess, a first channel and a second channel, a region between the first channel and the second channel defining an interface surface,
    wherein the interface surface is adapted to provide a continuous seal between the glass coverslip and the interface surface of the recess, and
    wherein the plastic frame and the glass coverslip are comprised of biocompatible materials.

14. The method of claim 13, wherein the method further comprises:
    e) placing a non-adhesive sealing agent on the interface surface, the non-adhesive sealing agent comprised of a biocompatible oil; and
    f) placing the glass coverslip into the recess, thereby forming the continuous seal between the glass coverslip and the interface surface.

15. The method of claim 13, wherein the glass coverslip is a surface coated glass coverslip.

16. The method of claim 13, wherein the at least one through hole is adapted to be at least one microwell, the at least one microwell configured to receive the biological sample.

17. The method of claim 13, wherein the continuous seal is configured to prevent contaminants from entering the at least one through hole.

18. The method of claim 13, wherein the method further comprises:
    forming a main cavity partially through the plastic frame from a second surface of the plastic frame towards the first surface, wherein the main cavity is configured to receive a lens.

19. The method of claim 18, wherein the lens is mechanically and removably coupled to the plastic frame.

20. A method of performing microscopy of a sensitive biological sample, the method comprising:
- providing a plastic frame including a first surface and a second surface opposite the first surface, the second surface including a recess adapted to receive a glass coverslip, the recess including a first channel and a second channel, the first channel and the second channel defining an interface surface between the first channel and the second channel, a through hole bored through the recess of the plastic frame, and the through hole is adapted to receive a biological sample;
- placing a non-adhesive sealing agent on the interface surface between the first channel and the second channel;
- placing a glass coverslip in the recess, wherein when the glass coverslip is placed in the recess, the non-adhesive sealing agent forms a continuous seal on the interface surface;
- mechanically securing the glass coverslip to the plastic frame; and
- placing a biological sample in the through hole, wherein the biological sample is in contact with the plastic frame and the glass coverslip.

* * * * *

UNITED STATES PATENT AND TRADEMARK OFFICE
CERTIFICATE OF CORRECTION

PATENT NO. : 12,313,833 B2
APPLICATION NO. : 17/754955
DATED : May 27, 2025
INVENTOR(S) : S. Ali Aghvami et al.

Page 1 of 1

It is certified that error appears in the above-identified patent and that said Letters Patent is hereby corrected as shown below:

In the Specification

Column 1, Line 19, "Not Applicable" should be --This invention was made with government support under 1420382 and 1827309 awarded by National Science Foundation (NSF) and under HD092550 awarded by National Institutes of Health (NIH). The government has certain rights in this invention.--.

Signed and Sealed this
Twenty-eighth Day of October, 2025

John A. Squires
*Director of the United States Patent and Trademark Office*